United States Patent
Porta

(10) Patent No.: US 6,467,145 B1
(45) Date of Patent: Oct. 22, 2002

(54) OPERATING UNIT WITH AN AUTOMATIC TOOL CHANGING DEVICE AND TRANSFER TOOL MACHINE INCLUDING THE SAME

(76) Inventor: Oscar Porta, Via San Lorenzo, 37/b, 25060 Cogozzo V.T. (Brescia) (IT)

( * ) Notice: Subject to any disclaimer, the term of this patent is extended or adjusted under 35 U.S.C. 154(b) by 0 days.

(21) Appl. No.: 09/537,797

(22) Filed: Mar. 29, 2000

(30) Foreign Application Priority Data

Sep. 10, 1999 (IT) .......................... MI99A1905

(51) Int. Cl.$^7$ .......................... B23Q 5/22; B23Q 3/157; B23B 29/32; B23C 5/26
(52) U.S. Cl. .................. 29/40; 29/39; 82/159; 408/35; 409/231; 483/56
(58) Field of Search ................ 483/55, 56; 82/159; 29/40, 39; 409/232, 233, 231; 408/235

(56) References Cited

U.S. PATENT DOCUMENTS

| | | | | |
|---|---|---|---|---|
| 3,604,083 A | * | 9/1971 | Antonietto et al. | 483/56 X |
| 4,677,719 A | * | 7/1987 | Linic | 29/40 |
| 5,093,973 A | * | 3/1992 | Steinbach | 29/39 |
| 5,125,142 A | * | 6/1992 | Kosho et al. | 29/40 |
| 5,383,261 A | * | 1/1995 | Yamamoto et al. | 29/40 |
| 5,730,691 A | * | 3/1998 | Tokura et al. | 29/40 |
| 5,820,537 A | * | 10/1998 | Zecchetto et al. | 483/55 X |

* cited by examiner

Primary Examiner—William Briggs
(74) Attorney, Agent, or Firm—Hedman & Costigan, P.C.

(57) ABSTRACT

An operating unit for a transfer tool machine comprises a turret head having a rotary plate, a plurality of tool holding devices arranged on the rotary plate, a supporting arm supporting the turret head on the tool machine framework and a mandrel which is driven by a reducing driving device also mounted on the machine tool framework.

9 Claims, 16 Drawing Sheets

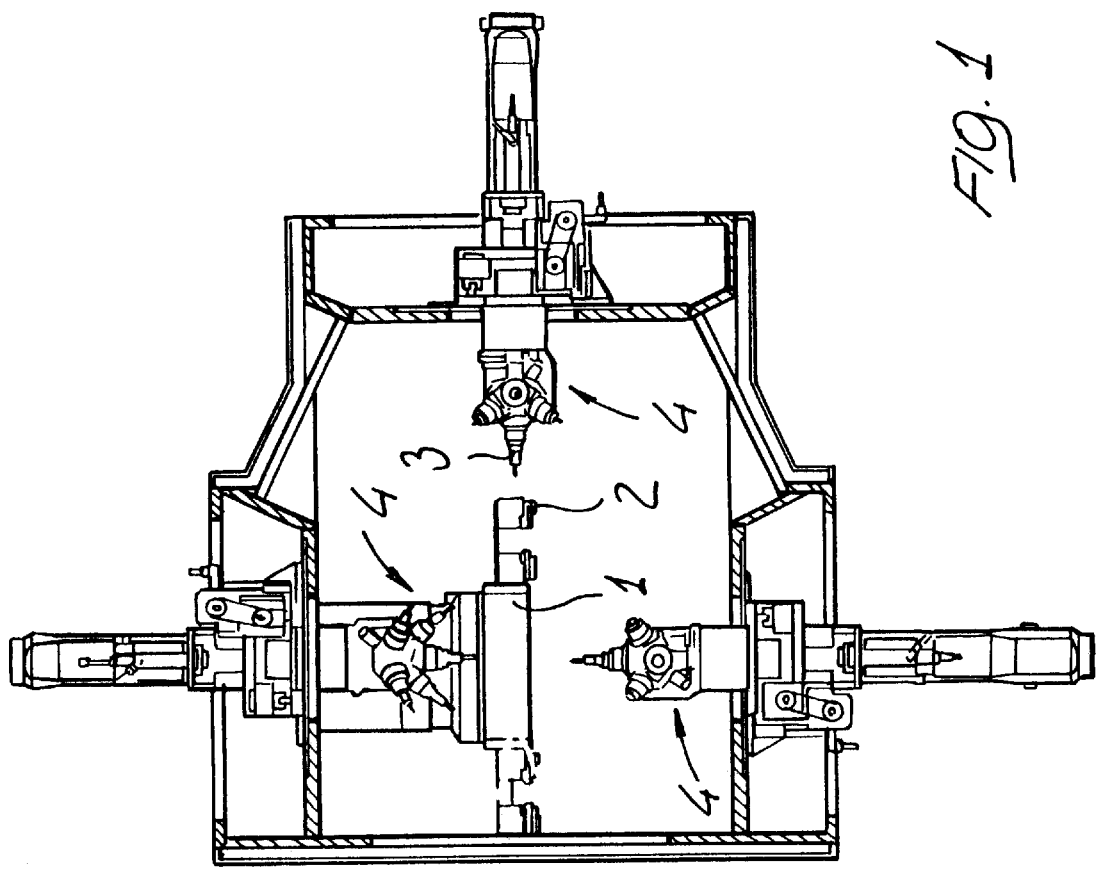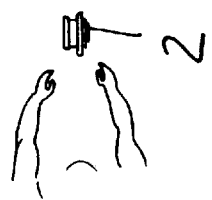
FIG. 1

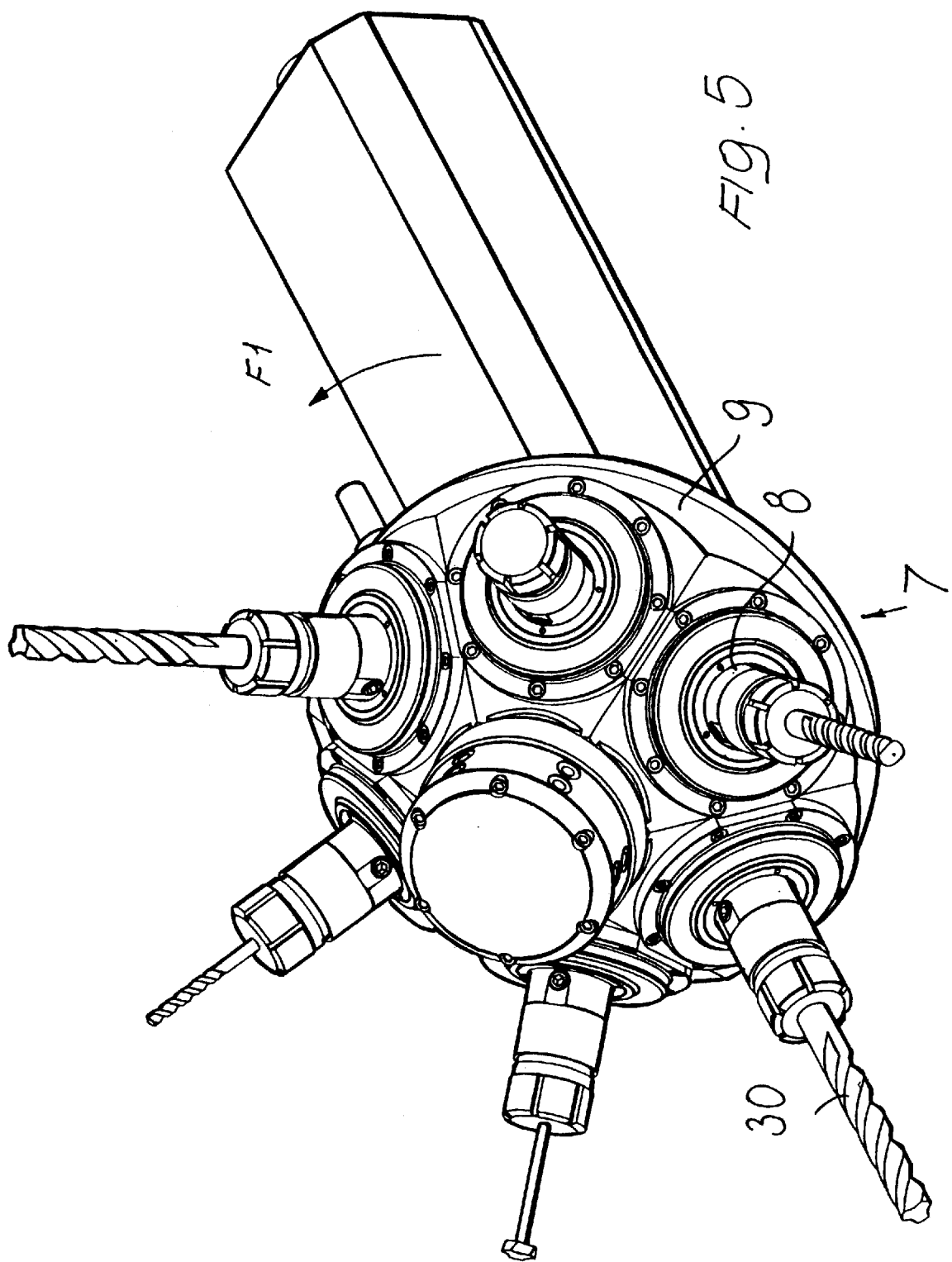

OPERATING UNIT WITH AN AUTOMATIC TOOL CHANGING DEVICE AND TRANSFER TOOL MACHINE INCLUDING THE SAME

BACKGROUND OF THE INVENTION

The present invention relates to an operating unit provided with a device for automatically changing the tools, specifically designed for transfer tool machines.

The invention also relates to a transfer machine including the above mentioned operating unit.

As is known, transfer tool machines are conventionally used for carrying out machining operations on a metal workpiece supplied in a raw form, in order to transform the workpiece into a finished product, by transferring the workpiece from a starting inlet machining station to an end machining station, or outlet station, by a rotary table transfer assembly.

The mentioned machining operations are performed by operating units which, usually, are designed for receiving a single tool and which, accordingly, carry out a specific or set processing or machining operation.

Thus, it would not be possible to modify an operating unit designed at the start or set for performing milling operations, to transform it into a threading unit, provided that the machining tool is not manually replaced.

In order to provide a transfer tool machine with a greater operating flexibility, machining heads provided with a tool automatic changing system have been made (the so-called "turret" heads).

The latter substantially comprise rotary turrets, which are cantilever-wise mounted on a related machining unit and supporting a plurality of tool holder devices, each of which is in turn provided with a dedicated mandrel and respective bearings.

Owing to the rotary movement driving the turret head, a same operating unit can be used for performing different machining operations on a workpiece, without manually changing the related machining tool.

However, prior operating units provided with turret tool holder heads are affected by great drawbacks, mainly related to the comparatively great size and the cantilever-wise arrangement thereof on the operating unit.

In order to reduce the construction size, the prior art provides to design single tool holder devices of reduced dimensions, and, accordingly, small size mandrels and bearings therefor.

As a result, the strength of these devices is correspondingly reduced, with a less consequent capability of resisting against the mechanical stress to which said devices are subjected as the workpiece is machined (loads on the mandrel and bearings, vibrations, impacts and so on).

Thus, prior operating units, specifically designed for receiving great strength tool holders, and having consequently a large size, must be proportionately enlarged, to receive great strength mandrels and bearings.

The machining unit, accordingly, will have a comparatively great size, and, moreover, it can be provided with only a comparatively small number of tool holders, considering the maximum size which can be tolerated on such an apparatus.

Furthermore, the cantilever-wise arrangement of the above mentioned turret heads, would involve a great front size with respect to the transfer tool machine mandrel, which would cause space and handling problems, which are increased as the size of the tool holders is increased.

SUMMARY OF THE INVENTION

Accordingly, the aim of the present invention is to provide a novel operating unit, which has a very reduced constructional size with respect to prior machining unit, the mechanical strength of the tool holding devices being the same.

Within the scope of the above mentioned aim, an object of the present invention is to provide such an operating or machining unit which is specifically designed for making the size of the turret head independent from that of the tool holders.

Yet another object of the present invention is to provide such an operating or machining unit for transfer tool machines, in which the sizing of the tool holding devices does not affect the mechanical strength properties of said operating unit.

The above mentioned aim and objects, as well as yet other objects, which will become more apparent hereinafter, are achieved by the operating unit and transfer tool machine as claimed in the independent claims 1 and 14.

Preferred embodiments of the invention are defined in the remaining claims.

With respect to a prior operating or machining unit, the operating unit according to the present invention provides the advantage of having a much smaller size, the mechanical strength of the tool holding devices being the same.

The operating unit according to the invention, moreover, provides the advantage that it it is much more simple and unexpensive construction wise, with respect to prior like operating units, owing to the use of a single mandrel, which is common to all of the tool holding devices.

BRIEF DESCRIPTION OF THE DRAWINGS

The above mentioned and further characteristics and advantages of the present invention will become more apparent hereinafter from the following detailed disclosure of the preferred embodiment of the operating or machining unit according to the invention which has been illustrated, by way of a non limitative example, in the figures of the accompanying drawings, where:

FIG. 1 is a schematic top plan view illustrating a rotary table transfer tool machine, including an operating or machining unit according to the present invention;

FIG. 5 is a perspective view illustrating the operating or machining unit according to the present invention with the turret head being turned from the position shown in FIG. 2;

DESCRIPTION OF THE PREFERRED EMBODIMENTS

Figure 2:
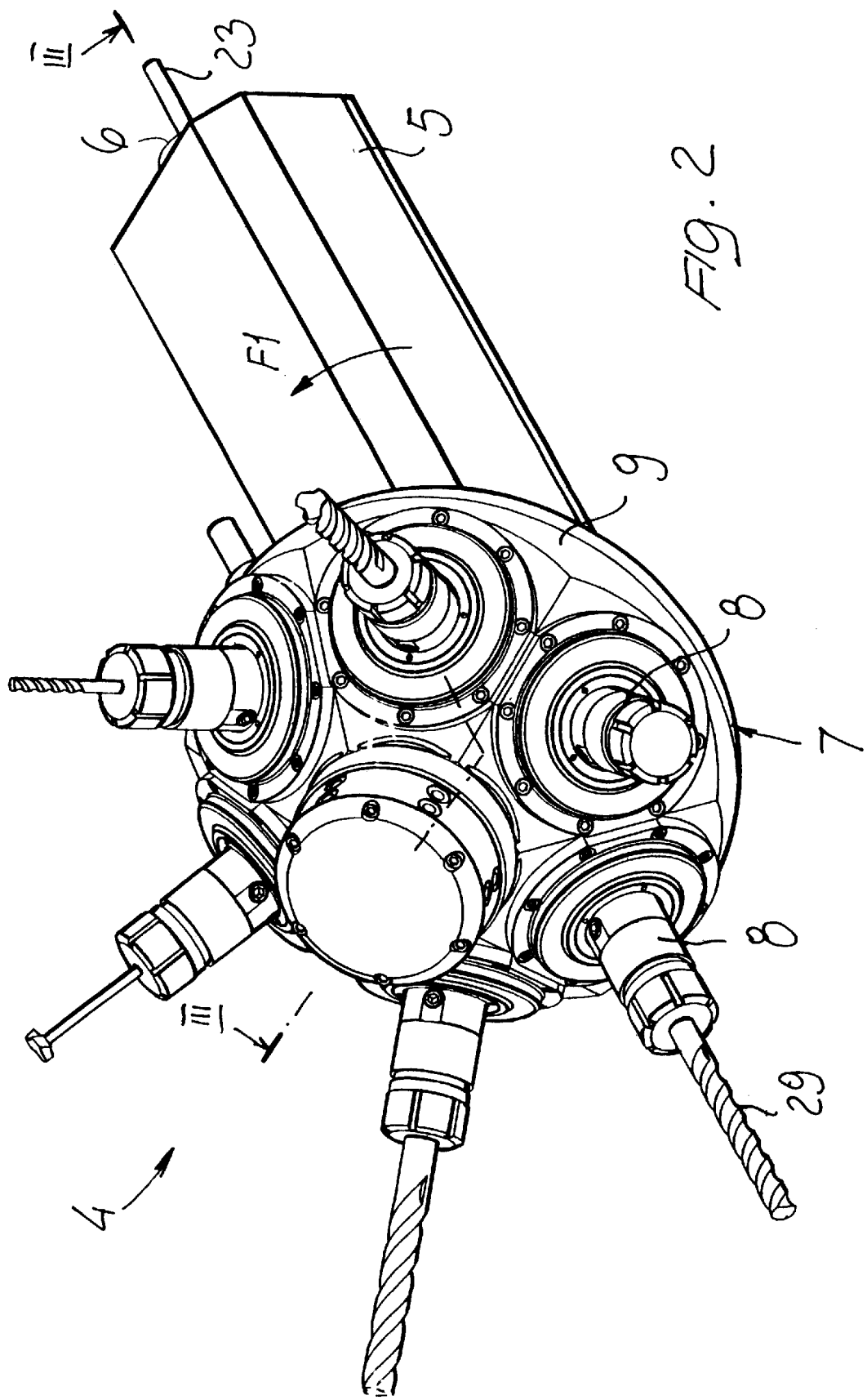
FIG. 2 is a perspective view illustrating the operating or machining unit according to the invention, at a latched tool holder position.

The transfer tool machine shown in FIG. 1 comprises a rotary table 1, supporting the workpieces or articles 2 to be processed or machined.

In particular, said workpieces 2, loaded in a raw condition on the rotary table 1, are machined by a plurality of machining tools 3 which are mounted on a corresponding operating or machining unit 4, in turn including a turret type of machining head.

According to the present invention, the operating or machining unit 4 comprises (FIGS. 2 and 3):

a turret head 7 provided with a rotary plate 9;

a plurality of tool holding devices 8 assembled on the rotary plate 9 of the turret head 7;

a supporting arm 5 for supporting the turret head 7 on the transfer tool machine framework;

a mandrel 6 which is driven by a driving-reducing means as assembled on the transfer tool machine.

Figure 3:
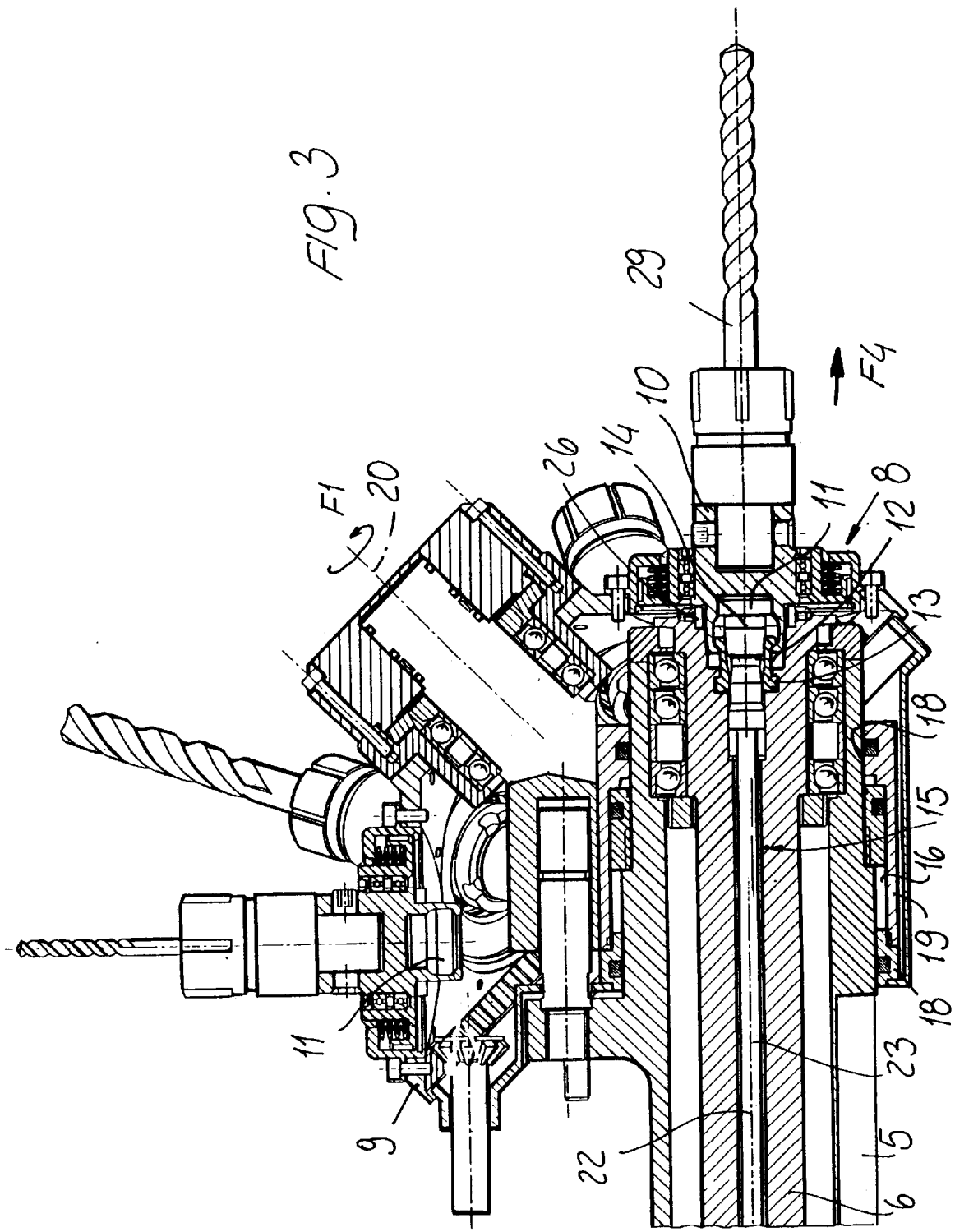
FIG. 3 Illustrates a cross-sectional view substantially taken along the line III—III of the operating or machining unit shown in FIG. 2.
Figure 7:
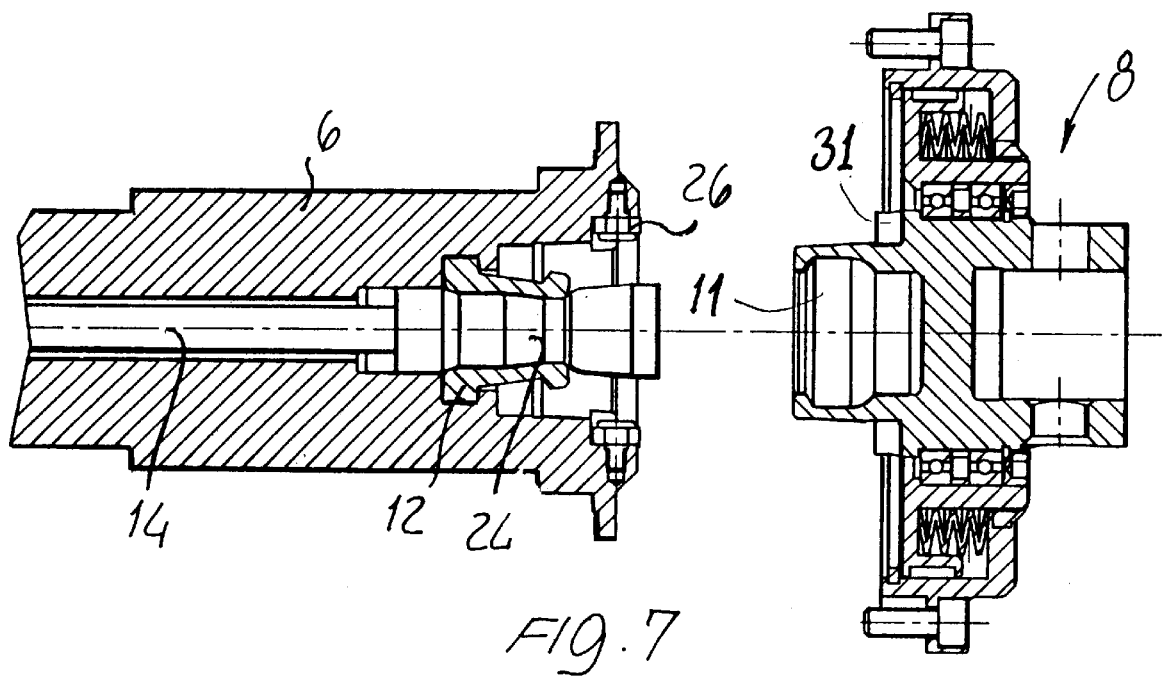
FIGS. 6 and 7 illustrate a detail of the tool holding device as assembled on the operating unit according to the invention, respectively at a latched or locked position and at an unlocked or unlatched position.
Figure 6:
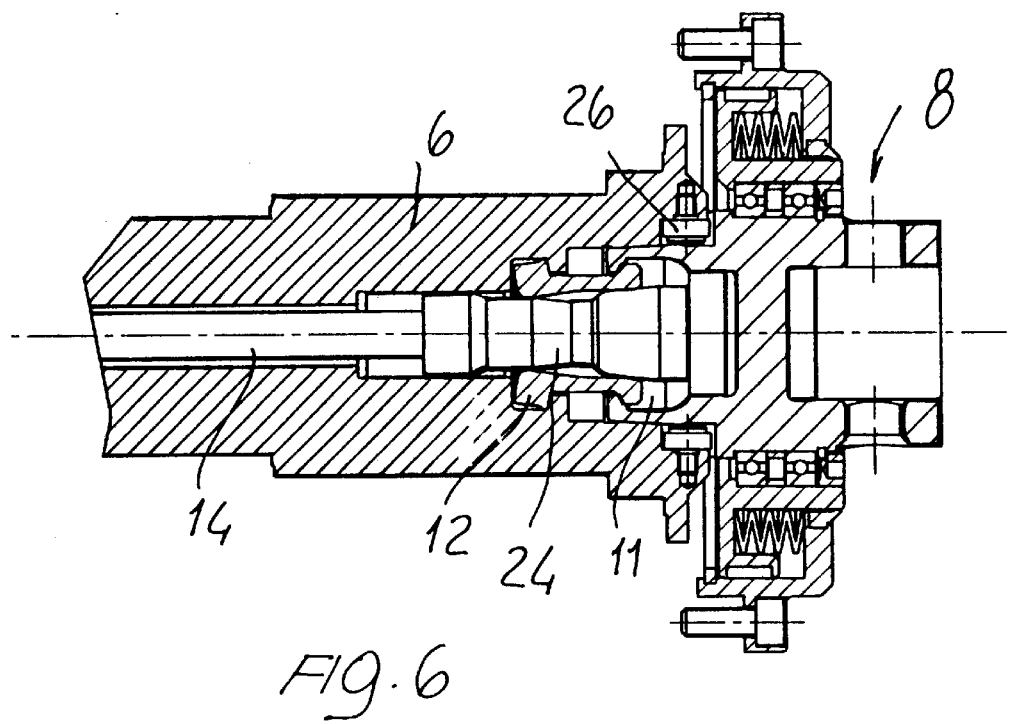

As is clearly shown in FIGS. 3, 6 and 7, each tool holding device 8 is provided with an attachment or fitting 10 for the machining tool 3, facing the outside of the plate 9.

The plate 9, in turn, is a substantially cap-shaped plate, and, through the outer mantle of the cap plate 9 are defined a plurality of openings, each being provided for receiving a respective operating tool, thereby the operating tools do not radially project, cantilever-wise, from the supporting plate 9, as it occurs in prior operating machines. Thus, as it should be apparent, the size of the operating unit is advantageously reduced to a minimum.

On the opposite side is moreover provided a clutch element 11 for coupling the tool holder to the machining or operating mandrel 6.

At the latching or locked position shown in FIGS. 3 and 6, the tool holder 8 is axially restrained on the head of the mandrel 6 by a quick coupling means, comprising an expanding ring 12, in turn housed in a seat 13 provided on said mandrel.

The ring 12 is provided, in its inside, with a slider 14 which can slide starting from a longitudinal axial hole 15 of the mandrel 6.

More specifically, the slider 14 is provided with a contoured portion 24, interfering against the ring 12 and being movable in the direction of the arrows F2, F3 of FIG. 3.

The above mentioned axial displacement is transmitted to said slider 14 through a hydraulic piston 23, provided on the rear portion of the mandrel.

The transmission of the rotary motion of the mandrel to the respective tool holder, mutually latched or locked in an axial direction by said expansion ring 12, is performed by engagement some wheel elements 26, rigid with one end of the mandrel 6 and having a radially oriented axis with respect to said end portion, with respective hollows 31 of the tool holder 8 portion facing the end of the mandrel 6 (see FIGS. 3, 5, 7, 10, 11).

Figure 8:
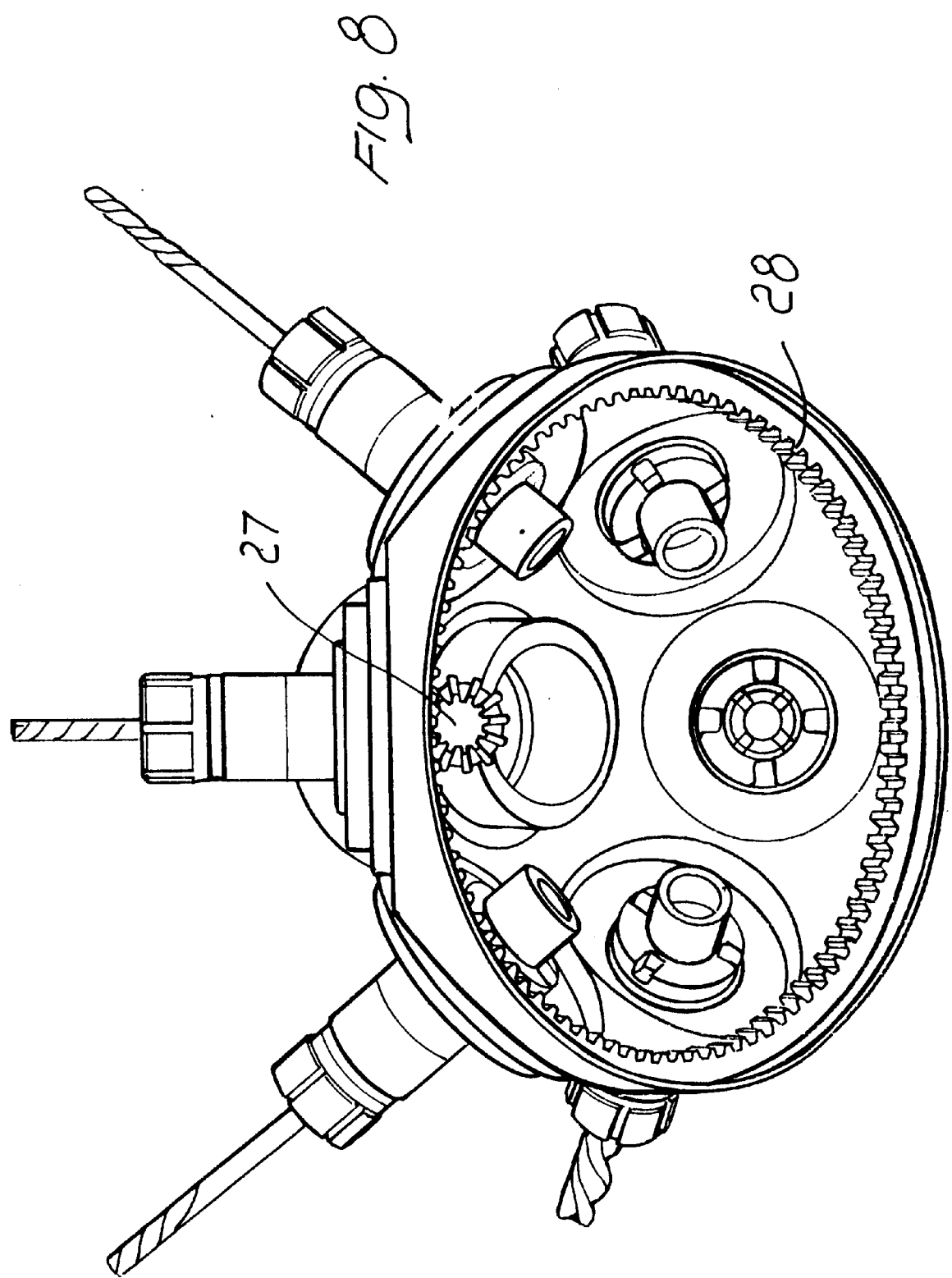
FIG. 8 is a perspective exploded view illustrating the tool holding plate of the operating unit of the preceding figures.
Figure 9:
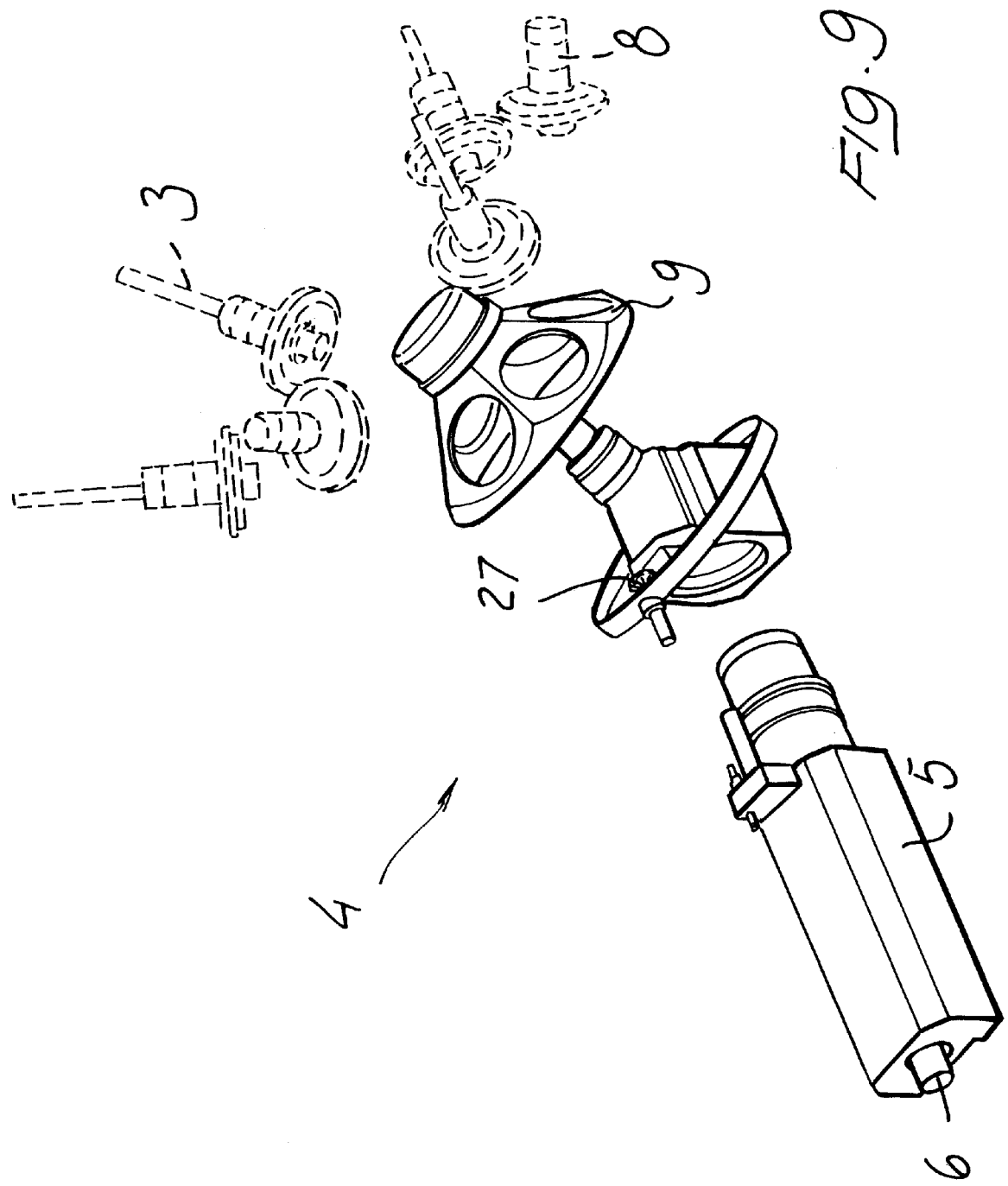
FIG. 9 is a further perspective exploded view of the tool holding plate and related coupling components of the operating unit.
Figure 10:
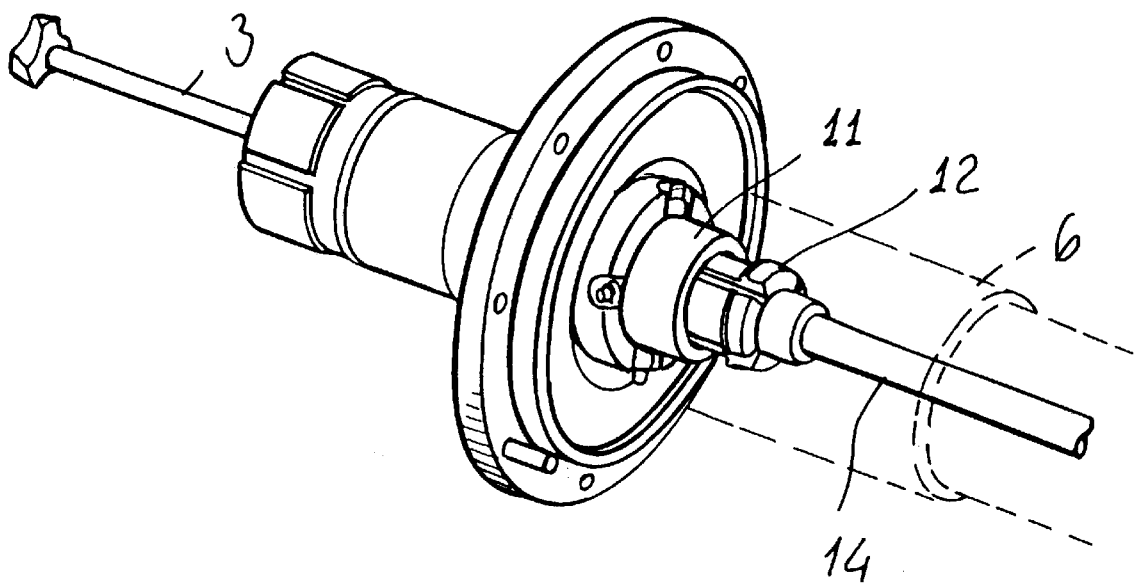
FIGS. 10 and 11 illustrate a detail of the tool holding device shown in the preceding figures, respectively in a locked condition thereof and in an unlocked condition thereof, in which it is respectively locked or unlocked to/from the mandrel.
Figure 11:
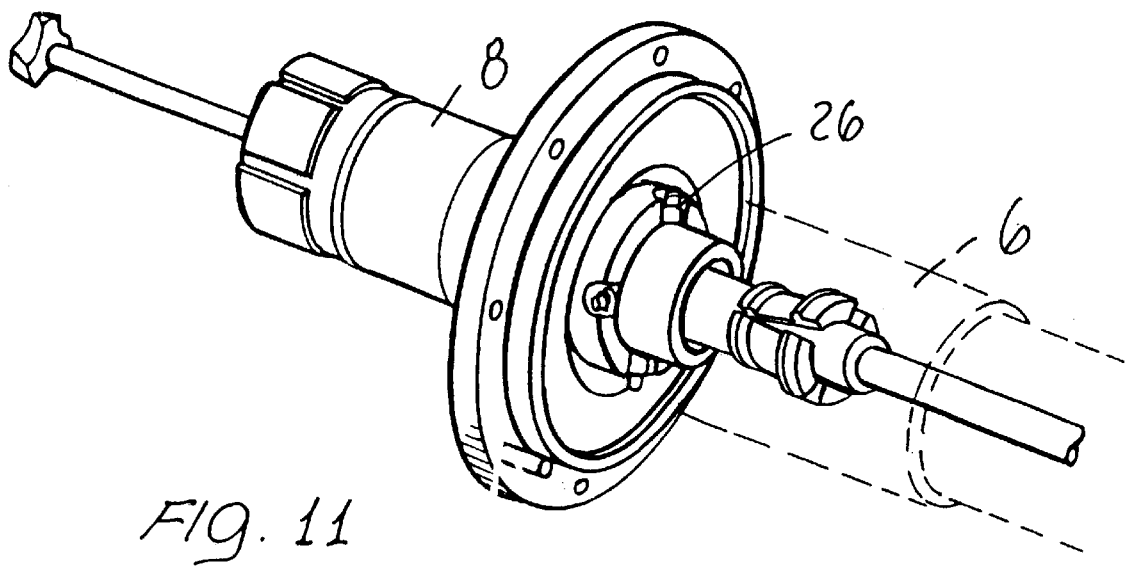
Figure 12:
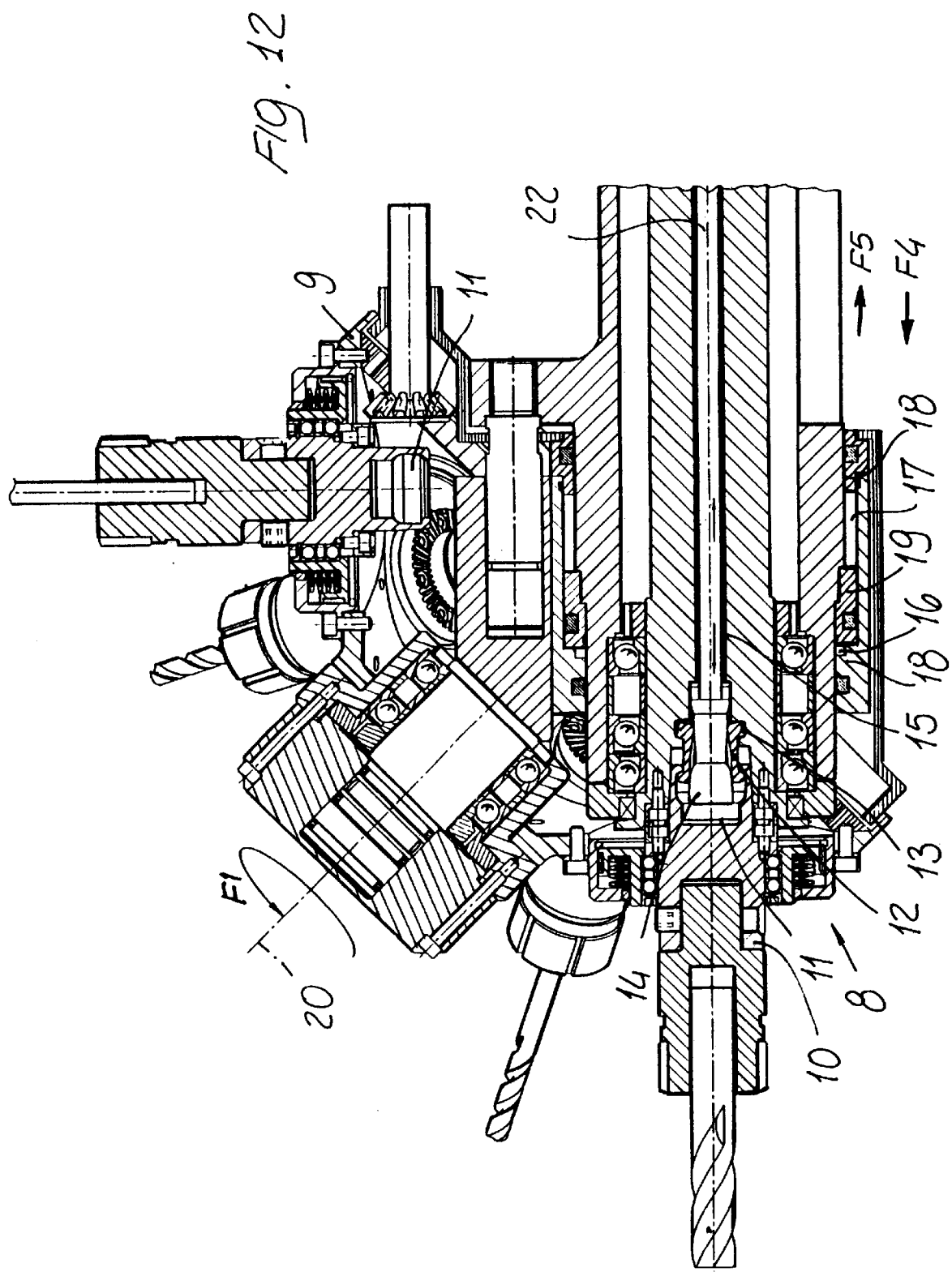
FIG. 12 illustrates a modified embodiment of the operating or machining unit according to the present invention, the tool holder being locked or latched to the mandrel.
Figure 13:
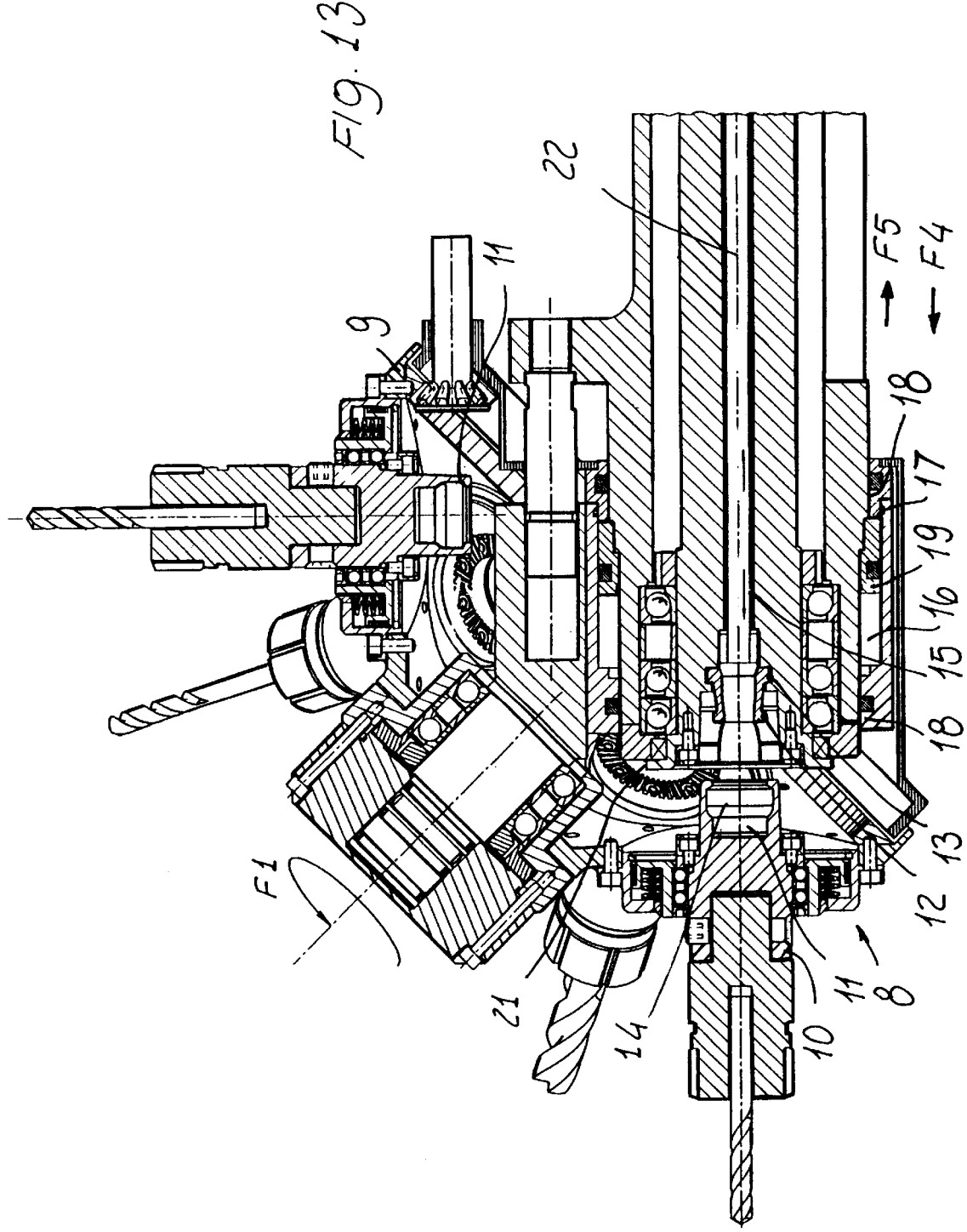
FIG. 13 illustrates the modified embodiment of FIG. 12 with the tool holder being in an unlatched or released-unlocked position.
Figure 14:
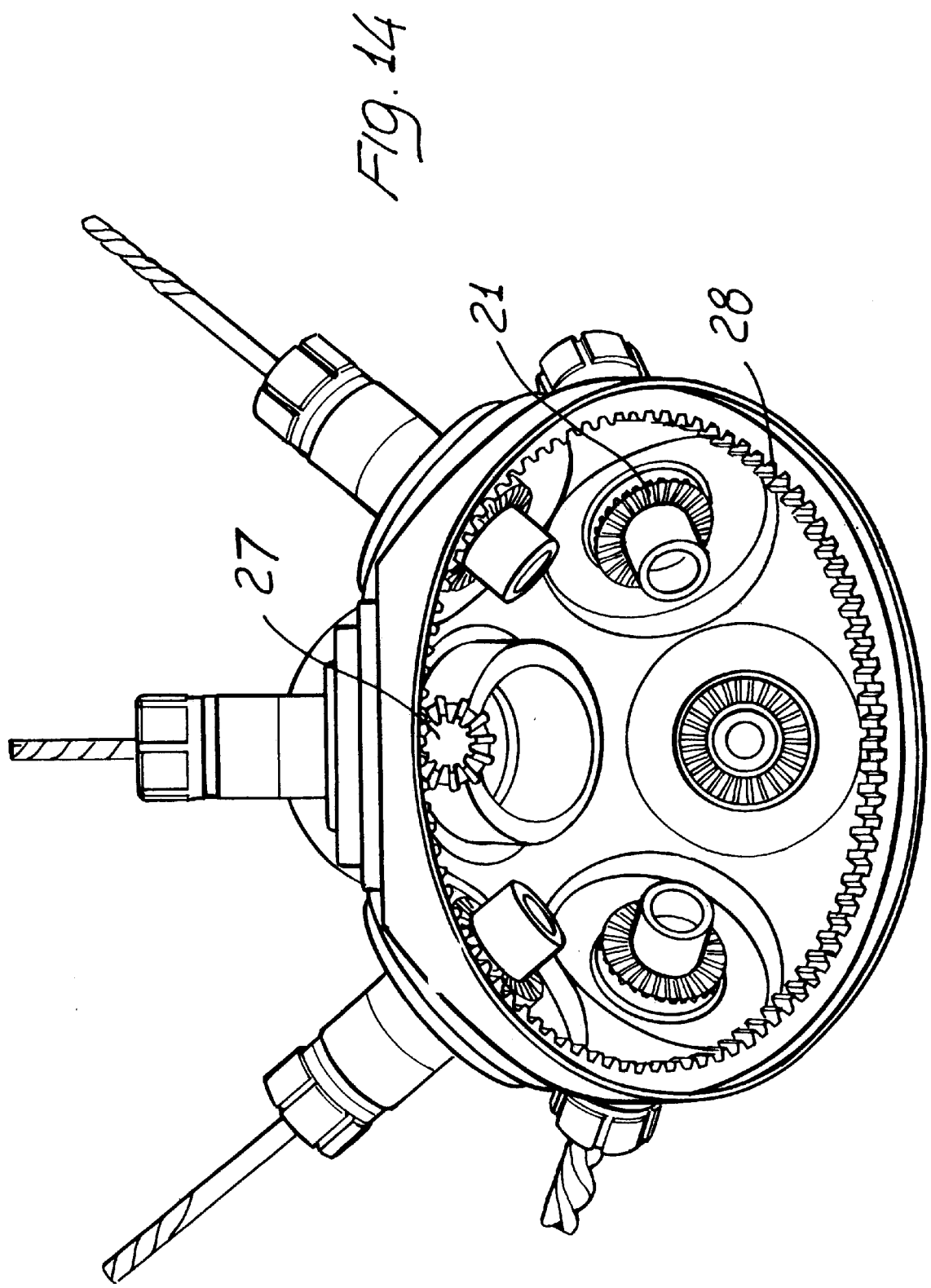
FIG. 14 is a further perspective view illustrating a detail of the turret head of the operating unit shown in FIGS. 12 and 13.
Figure 15:
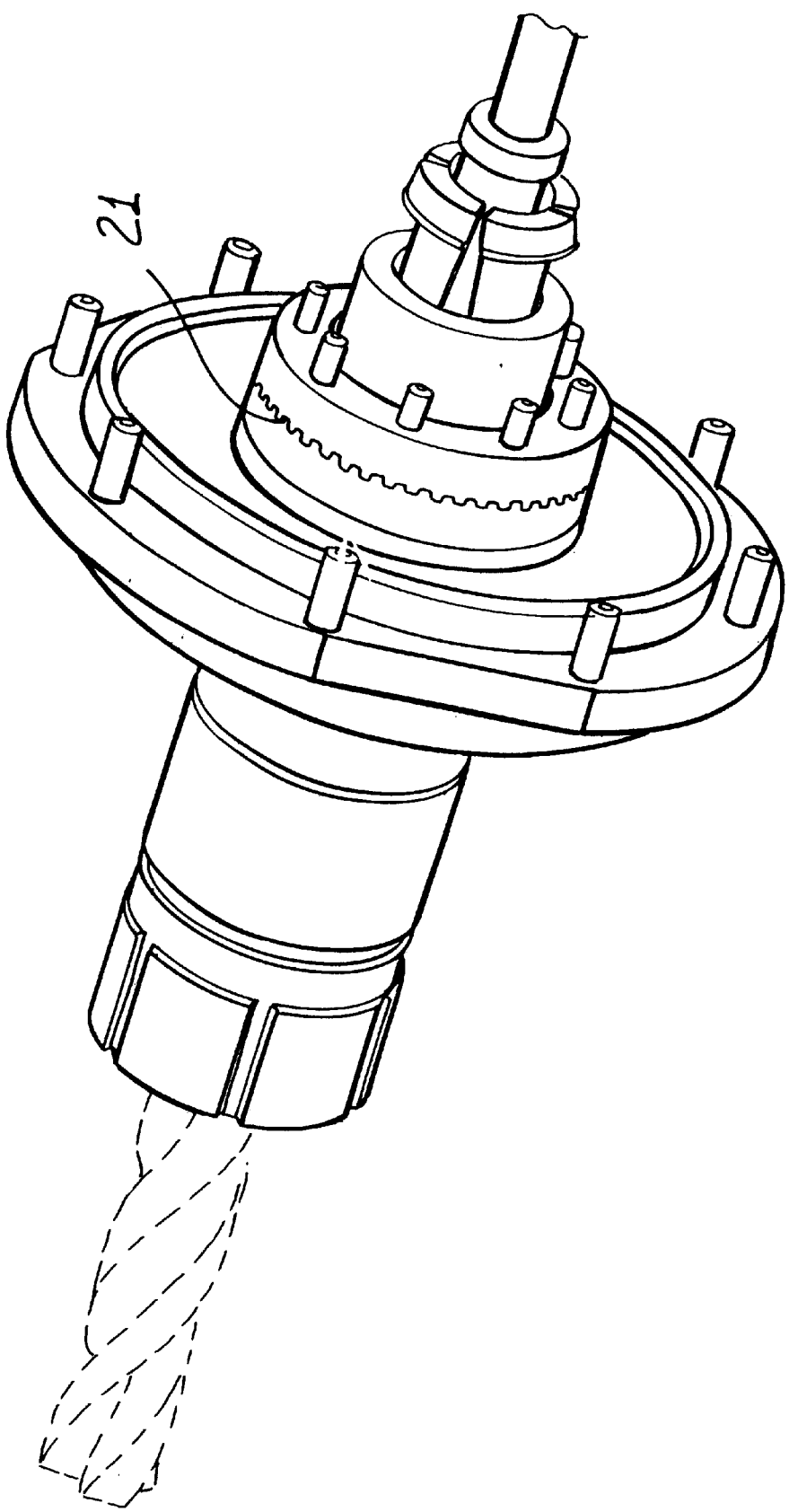
FIGS. 15 and 16 illustrate a detail of the tool holder device as assembled on the operating unit of FIGS. 12 and 13, respectively at a latched position and at an unlatched position, with respect to said mandrel.
Figure 16:
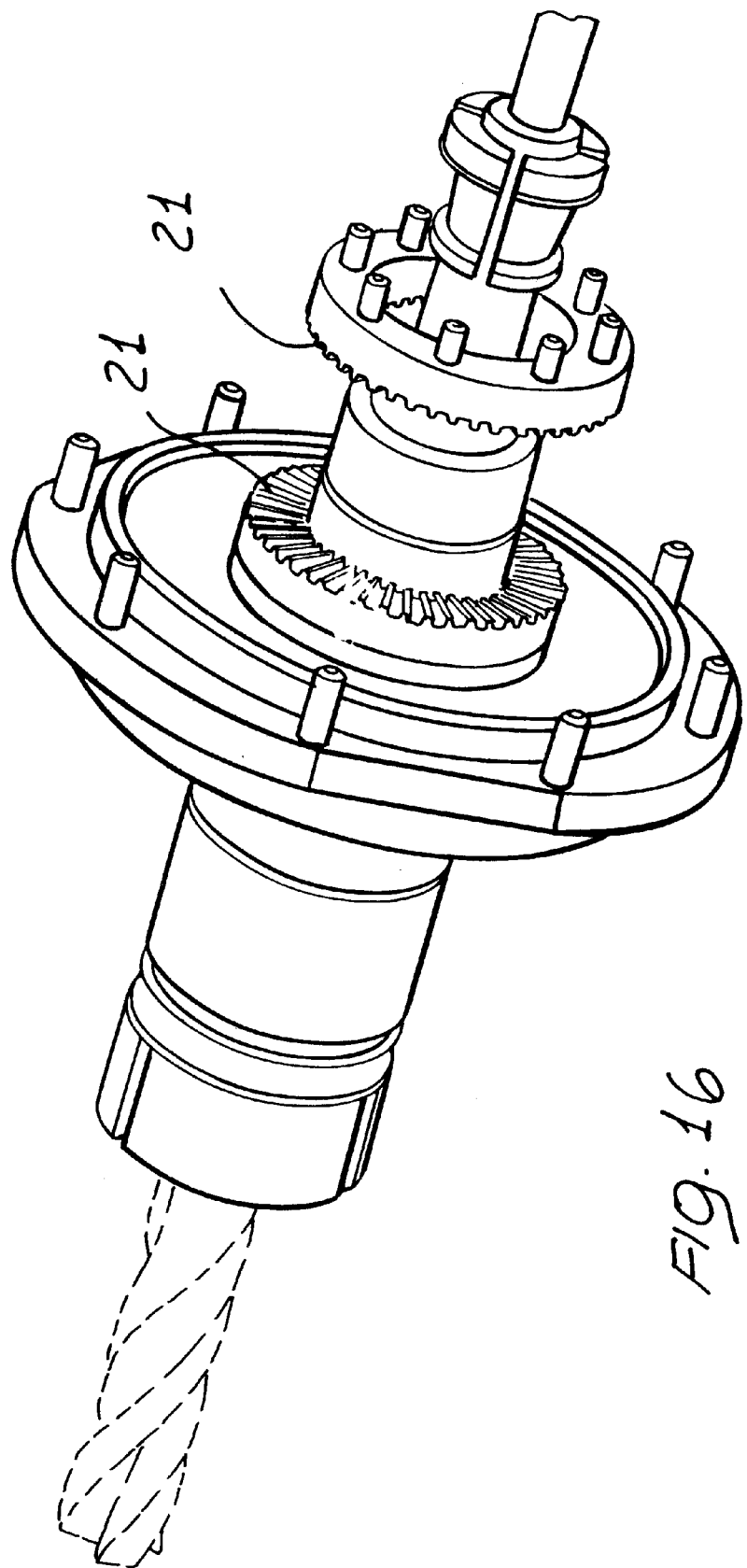

As is clearly shown in FIGS. 3, 8 and 9, the turret head 7 is provided with an inner contoured hollow seat or recess 18, in which is slidably engaged the supporting arm 5 supporting the unit 4.

Figure 4:
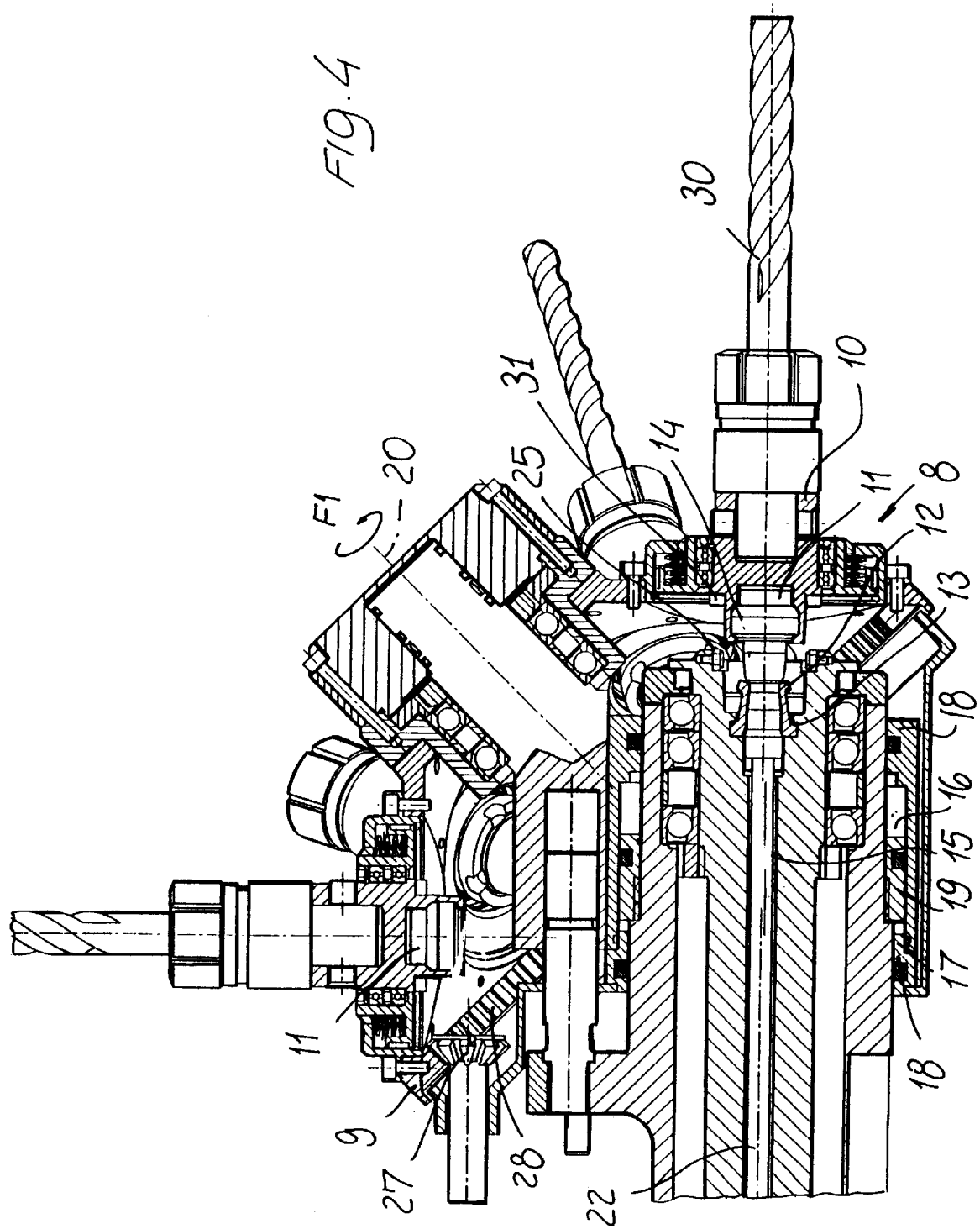
FIG. 4 is a further cross-sectional view illustrating the inventive operating or machining unit, the tool holder or holding device being shown in a unlatched or released position.

A hydraulic piston 19 cylinder 16, 17 assembly is coupled to the arm 5 for axially driving the turret head 7 with respect to the mandrel 6, in the directions of the arrows F4 and F5 shown in FIGS. 3 and 4.

More specifically, the displacement of the turret head 7 of the mandrel in the direction of the arrow F4 is performed simultaneously to the driving of the piston 23 in the direction of the arrow F2 of FIG. 3.

Thus, owing to the above mentioned driving or displacement, the contoured portion 24 of the slider 14 will be driven inside the expanding ring 12, so as to cause the diameter of said ring to be reduced thereby allowing the tool holder 8 to be quickly disengaged from the mandrel 6 (see FIGS. 4 and 7).

Then, the plate 9 can be turned about the turning axis 20, for example in the direction of the arrow F1 shown in FIG. 4.

This rotary movement is obtained by the pinion 27 and rack 28 assembly, shown in FIGS. 8 and By the above mentioned rotary displacement, the tool holder 29 of FIG. 2 can be exchanged, on the mandrel 6, by the tool holder 30 of FIG. 5.

As the tool holder 30 is aligned on the axis 22 of the mandrel 6 (FIG. 4), the piston 19 will drive the turret head 7 in a return movement in the direction of the arrow F5 shown in FIG. 4, thereby allowing the mandrel head to be locked inside the clutch element 11 of the same tool holder.

Then, the slider 14 is back-driven in the direction of the arrow F3 shown in FIG. 4, thereby causing the ring 12 to be expanded in its side 13 on the head of the mandrel.

Then, the tool holder 30 will be locked again on its mandrel 6.

In the modified embodiment shown in FIGS. 12 to 16, the operating or machining unit 4 is provided, instead of the wheel 26 locking system of the tool holders 8, with a crown clutch element 21 preferably of the type HIRTH.

Accordingly, on one side, the coupling of the expanding ring 12 to the slider 14 will provide an axial locking of the tool holder and the mandrel; on the other side, the HIRTH crown system will provide a transmission of the rotary movement from the mandrel 6 to the tool holder 8, already axially engaged on said mandrel.

The several operating steps of the machining unit according to the invention are clearly shown in FIGS. 17 to 20.

Figure 17:
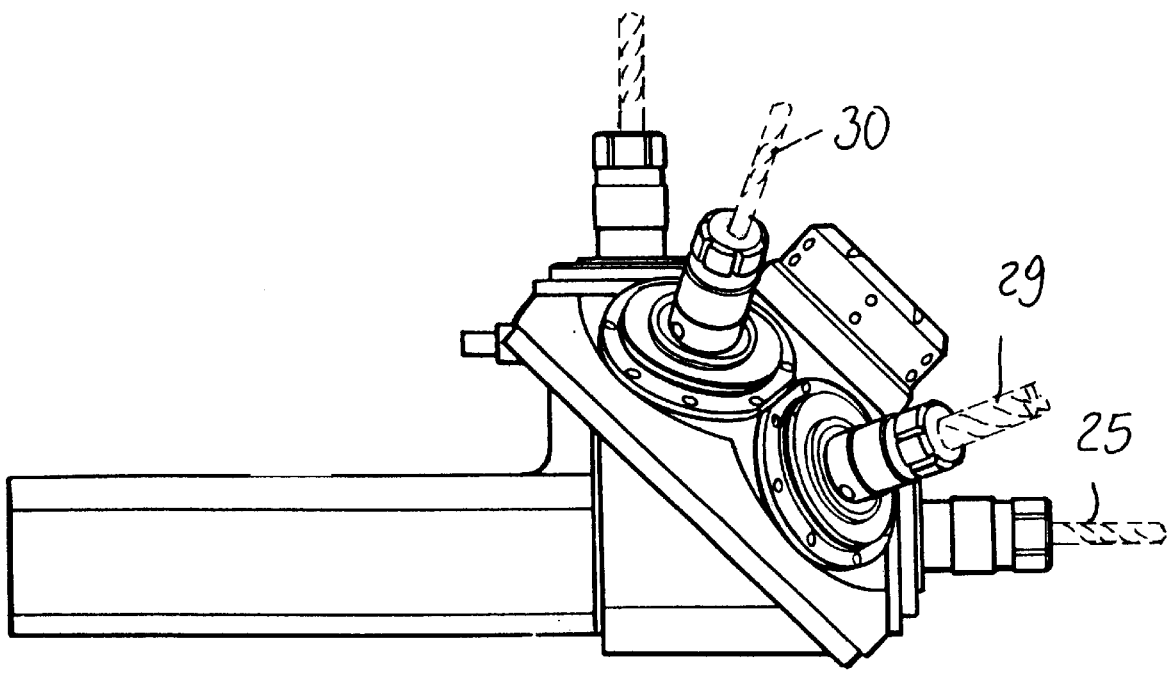
FIGS. 17 to 20 illustrate operation machining steps or operations performed by the operating or machining unit according to the present invention.

At the start, the tool holder performing the machining will be the tool holder 25 shown in FIG. 17.

Figure 18:
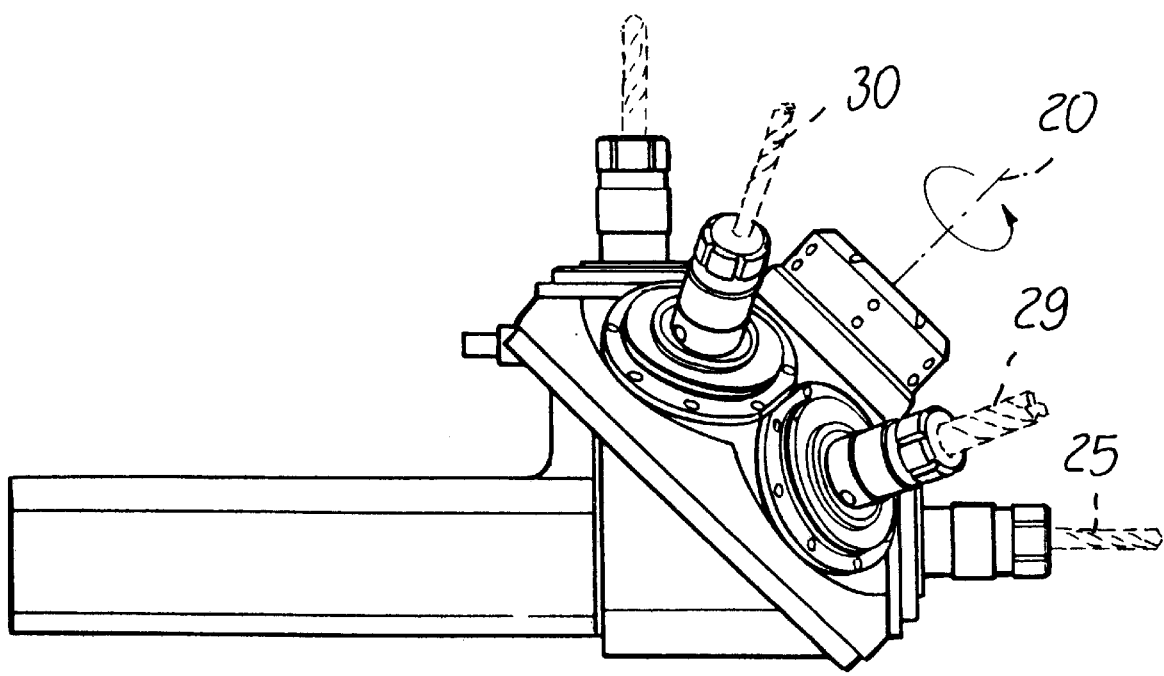

The replacement of this tool holder, for example by the tool holder 29, is performed by turning the turret head 27 as shown by the arrow F1 of FIG. 18, upon removing said turret head, in the direction of the arrow F4, from said mandrel 6.

Figure 19:
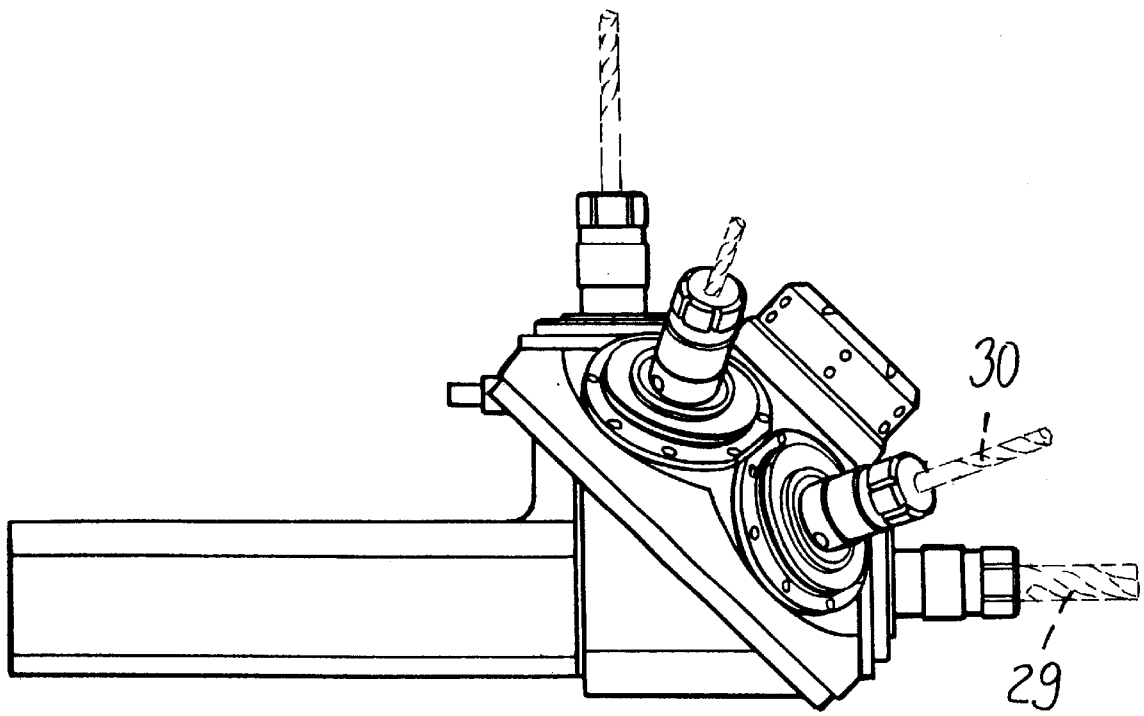
Figure 20:
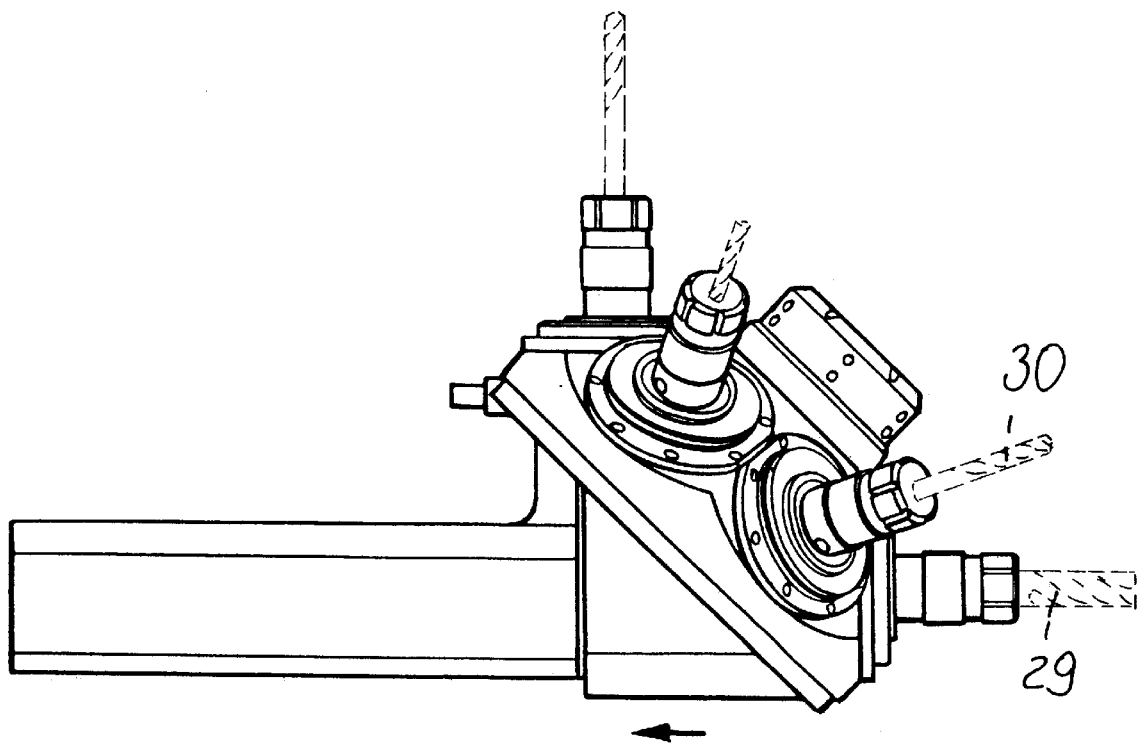

The new arrangement or position of the tool holder 29 is shown in FIG. 19, FIG. 20 illustrating the recovering of the locking status or condition of this tool holder on the mandrel, by driving the turret head 7 in the direction of the arrow F5.

Instead of the wheel assembly 26 or of the crown clutch system HIRTH 21, it could be used any other like means designed for providing equivalent functions.

Likewise, the piston drive 19 for driving the turret head 7 can be replaced by a ball recirculating screw system.

Moreover, for providing a quick locking operation, it is possible to use any other devices operating like the above disclosed expanding ring.

What is claimed is:

1. An operating unit for a transfer tool machine, said transfer tool machine having a framework, said operating unit comprising a turret head having a tool supporting rotary plate, defining an outer surface and an inner seat, a plurality of tool holding devices supported on said outer surface of said tool rotary plate, a supporting arm for supporting said turret head on said framework, an operating mandrel having a mandrel head and being coupled to said tool holding devices through a clutch coupling system, a plurality of openings being formed through said outer surface of said rotary plate each for receiving a said tool holding device, wherein said clutch coupling system comprises an expanding ring engaged in a seat formed on said head of said mandrel for engaging therein a corresponding clutch element provided on a said tool holding device, said ring including a slider for driving said expanding ring from a latching position of a said tool holding device in which said tool holding device is latched to said mandrel to an unlatching position of said tool holding device, said mandrel head being rigid with a plurality of rotary driving means each provided for engaging with a respective recess of said tool holding device for rotatively driving said respective tool holding device, said rotary plate including in said inner seat thereof a pinion-rack assembly for rotatively driving said rotary plate about a rotary axis thereof.

2. An operating unit according to claim 1, wherein said slider is slidably engaged in an axial longitudinal hole of said mandrel and has a contoured portion for engaging said expanding ring and is driven by a piston from a position in which said expanding ring holds said tool holding device locked on said mandrel to a position in which said expanding ring unlocks said tool holding device from said mandrel.

3. An operating unit according to claim 1, wherein said rotary driving means at said head of said mandrel comprise a plurality or radial projections for engaging each in each said recess of each said tool holding device.

4. An operating unit according to claim 3, wherein said projections comprise wheel elements having a rotary axis radially extending from said mandrel.

5. An operating unit according to claim 3, wherein said rotary driving means comprise crown clutch elements which are fixed, on a side, to said head of the mandrel and, on an opposite side, to said tool holding devices.

6. An operating unit according to claim 1, wherein said turret supporting arm is a rotary axially sliding supporting arm including an axial longitudinal recess for engaging therein said mandrel.

7. An operating unit according to claim 6, wherein said turret supporting arms has an end portion engaged in a seat of said turret head, turret head driving means which are provided for slidably driving said turret head on said arm.

8. An operating unit according to claim 7, wherein said turret head driving means comprise a cylinder and piston assembly.

9. An operating unit according to claim 7, wherein said turret head driving means comprise a ball recirculating screw assembly.

* * * * *